(12) United States Patent
Amano et al.

(10) Patent No.: US 8,413,782 B2
(45) Date of Patent: Apr. 9, 2013

(54) MULTIPLE DISC CLUTCH APPARATUS

(75) Inventors: Makoto Amano, Shizuoka (JP); Kenji Toda, Shizuoka (JP); Tooru Takahashi, Saitama (JP); Yoshiharu Saitou, Saitama (JP)

(73) Assignees: Kabushiki Kaisha F.C.C., Shizuoka (JP); Honda Motor Co., Ltd., Tokyo (JP)

( * ) Notice: Subject to any disclaimer, the term of this patent is extended or adjusted under 35 U.S.C. 154(b) by 727 days.

(21) Appl. No.: 12/608,893

(22) Filed: Oct. 29, 2009

(65) Prior Publication Data

US 2010/0108459 A1 May 6, 2010

(30) Foreign Application Priority Data

Oct. 29, 2008 (JP) ................. 2008-278076

(51) Int. Cl.
  *F16D 25/0638* (2006.01)
  *F16D 25/12* (2006.01)
  *F16D 25/10* (2006.01)
(52) U.S. Cl.
  USPC .............. 192/85.29; 192/85.34; 192/48.611
(58) Field of Classification Search ............ 192/48.611, 192/48.613, 48.614, 48.618, 85.27–85.31, 192/85.34, 85.35, 85.45, 106 F
See application file for complete search history.

(56) References Cited

U.S. PATENT DOCUMENTS

| 4,271,951 | A | * | 6/1981 | Nishimura et al. | ........ 192/106 F |
| 4,840,261 | A | * | 6/1989 | Oshidari et al. | ............. 192/85.3 |
| 5,680,919 | A | * | 10/1997 | Sekiguchi | ................... 192/85.3 |
| 5,967,929 | A | * | 10/1999 | Matsuoka et al. | ....... 192/48.611 |
| 6,892,869 | B2 | * | 5/2005 | Ookita et al. | .............. 192/85.34 |
| 7,588,130 | B2 | * | 9/2009 | Heuler et al. | .................. 192/3.3 |
| 8,109,377 | B2 | * | 2/2012 | Mizuno et al. | ........... 192/48.611 |
| 2005/0217962 | A1 | * | 10/2005 | Pedersen et al. | ......... 192/85 AA |
| 2006/0289267 | A1 | * | 12/2006 | Ito | ............................. 192/85 R |

FOREIGN PATENT DOCUMENTS

| JP | 04-113336 | 4/1992 |
| JP | 04-341652 | 11/1992 |
| JP | 2001-227307 | 8/2001 |

* cited by examiner

*Primary Examiner* — David D Le
*Assistant Examiner* — Jacob S Scott
(74) *Attorney, Agent, or Firm* — Knobbe, Martens, Olson & Bear LLP (57) ABSTRACT

A clutch can comprise driving clutch plates spline-fitted on an input member, driven clutch plates arranged alternately with the driving clutch plates and spline-fitted on an output member, a clutch piston having one surface facing an oil pressure chamber and another surface facing the clutch plates and adapted to be displaced toward the plates by supplying oil to the oil pressure chamber and to be returned by discharging the oil from the chamber. A valve can pass through the clutch piston and be adapted to be closed for preventing oil from exiting the chamber to the other side of the clutch piston when the clutch is clutched-on and to be opened and allow airflow to the oil pressure chamber when the clutch is clutched-off. One or more weight reduction recesses can be formed on one surface of the clutch piston near the outer circumference further radially outward than the valve.

8 Claims, 14 Drawing Sheets

MULTIPLE DISC CLUTCH APPARATUS

CROSS-REFERENCE TO RELATED APPLICATIONS

The present application is based on and claims priority under 35 U.S.C. §119 to Japanese Patent Application No. 2008-278076, filed on Oct. 29, 2008, the entire contents of which is expressly incorporated by reference herein.

BACKGROUND OF THE INVENTIONS

1. Field of the Inventions

The present inventions relate to multiple disc clutch apparatuses, such as clutches provided with a clutch piston which can be displaced toward a clutch-on side by oil supplied to an oil pressure chamber to pressure-contact driving clutch plates and driven clutch plates with each other.

2. Description of the Related Art

There are two types of power transmitting apparatus for selectively transmitting or cutting off a power of an engine to or from wheels such as a manual transmission (MT) manually operating speed change of a vehicle and an automatic transmission (AT) automatically operating the speed change. The AT can easily perform speed change operations, however it is inferior in operation response due to its use of a torque converter. On the other hand, the MT is superior in the operation response, however it is liable to cause shocks during speed change operations.

In view of reduction of the speed change shocks and of improvement of speed change response, Japanese Laid-open Patent Publication No. 341652/1992 describes a multiple disc clutch apparatus provided with a plurality of clutch members. The multiple disc clutch apparatus of this prior art reference has a clutch piston arranged with its one surface facing toward an oil pressure chamber and the other surface being facing toward driving clutch plates or driven clutch plates. In such a multiple disc clutch apparatus, control of the clutch can be automatically performed in accordance with a velocity of vehicle and thus automatic speed changing operation can be carried out without causing a large shock in the speed changing operation.

The clutch piston of the prior art is so constructed that it can be displaced toward a clutch-on side by oil supplied to an oil pressure chamber to pressure-contact driving clutch plates and driven clutch plates each other so as to transmit a driving force of an input member to an output member and also can be returned toward a clutch-off side by discharging the oil in the oil pressure chamber to separate the driving and driven clutch plates from each other so as to cut off the transmission of driving force from the input member to the output member.

The clutch piston of the prior art also has a check valve adapted to occupy a closed condition for preventing the oil from flowing from the oil pressure chamber to the side of other surface of the clutch piston when the clutch apparatus is clutched on and also adapted to occupy an opened condition for allowing flow of air from the side of other surface to the oil pressure chamber when the clutch apparatus is clutched-off.

SUMMARY OF THE INVENTIONS

It can be beneficial to further reduce the weight of the multiple disc clutch apparatuses to improve the efficiency of its power transmission. The weight of the clutch piston can be reduced by removing material forming the clutch piston. However if the removing of material of the clutch piston is improperly performed and thus the configuration of the clutch piston is undesirably changed, the volume of the oil pressure chamber would be varied and thus the response time of operation of the clutch piston would be also varied. This would cause increase of shock during the speed change of vehicle.

Thus, in accordance with an embodiment, a multiple disc clutch apparatus can comprise a plurality of driving clutch plates spline-fitted and axially slidable on an input member rotated by a driving source. A plurality of driven clutch plates can be arranged alternately with the driving clutch plates and spline-fitted and axially slidably on an output member. A clutch piston can have a first surface facing toward an oil pressure chamber and a second surface facing toward the driving clutch plates or driven clutch plates, the clutch piston can also be configured to be displaced toward a clutch-on side when oil is supplied to the oil pressure chamber and thereby pressure-contact the driving clutch plates and driven clutch plates to each other so as to transmit a driving force of the input member to the output member, the clutch piston also being configured to be returned toward a clutch-off side when oil is discharged from the oil pressure chamber and thereby allowing the driving and driven clutch plates to separate from each other so as to cut off the transmission of driving force from the input member to the output member. A valve can be formed so as to pass through the first surface and the second surface of the clutch piston and configured to occupy a closed condition preventing the oil from flowing from the oil pressure chamber to the side of second surface of the clutch piston when the clutch apparatus is clutched-on, the valve also being configured to occupy an opened condition allowing flow of air from the side of second surface to the oil pressure chamber when the clutch apparatus is clutched-off. Additionally, at least one recess providing weight reduction can be formed on the first surface of the clutch piston at a position near an outer circumference of the clutch piston, further radially outward than the valve.

In such embodiments, since a recess (or recesses) for weight reduction is (or are) formed on one surface of the clutch piston at a position near the outer circumference, further radially outward than the valve, it is possible to reduce the weight of a clutch piston substantially without changing the volume of a oil pressure chamber and improve the response of the clutch piston with suppressing shock during speed change of a vehicle.

That is, since the recess is formed at a substantially radially outermost portion along the outer circumference of the clutch piston, the recess can be always filled with oil moved radially outward by the action of centrifugal force when the clutch piston is returned to the clutch-off side by discharging oil from the oil pressure chamber. Accordingly it is possible to reduce the weight of the clutch piston and thus to improve the response thereof without substantially varying the volume of the oil pressure chamber even though the recess for weight reduction of the clutch piston is provided.

In addition, since the recess is formed at a position further radially outward than a position at which the valve is arranged, it is possible to reduce the inertia and thus the response of the clutch piton more effectively than a case in which the recess is formed at a position radially inward of the valve means.

DETAILED DESCRIPTION OF THE PREFERRED EMBODIMENT

A multiple disc clutch apparatus can be configured to transmit or cut off a driving force of a power source, such as but without limitation, an engine of a vehicle to or from driving wheels. Although the embodiments below are described in the context of a unit clutch comprising an advancing clutch 2 and a reversing clutch 3, it is possible to apply the present inventions to clutches in which a plurality of different stages (e.g. a four-speed clutch or a five-speed clutch) are united, single clutches, as well as other devices.

As shown in FIGS. 1~5, the multiple disc clutch apparatus can be formed as a combined type of an advancing clutch 2 and a reversing clutch 3. The clutch apparatus can comprise an input shaft 1 and clutch-outers 4, 12 forming an input member, clutch-inners 5, 13 forming an output member, and clutch pistons 8, 16. The input shaft 1 can be rotated by the driving source (engine) and formed therein oil passages Y, Y1, Y2 etc. described more in detail below.

The advancing clutch 2 can comprise the clutch-outer (input member) 4 driven by the driving force of an engine via the input shaft 1, the clutch inner (output member) 5 connected to driving wheels (not shown) of a vehicle, a plurality of driving clutch plates 6, a plurality of driven clutch plates 7, and the clutch piston 8. In drawings a reference numeral 9 denotes a Belleville spring and a reference numeral 10 denotes a return spring arranged between a spring seat 11 and the clutch piston 8.

The driving clutch plates 6 can comprise a plurality of annular plate members spline-fitted on the clutch outer 4 slidably in an axial direction (right and left directions in FIG. 1) therealong. The driven clutch plates 7 comprises a plurality of annular plate members arranged alternately with the driving clutch plates 6 and spline-fitted on the clutch inner 5 slidably in an axial direction (right and left directions in FIG. 1) therealong. Since the driving clutch plates 6 and the driven clutch plates 7 are arranged alternately each other in a layered structure, it is possible to shift them to a pressure-contacted condition (shown in FIG. 2) and to a separated condition (shown in FIG. 1).

In the present specification, the term "separated condition" means not only a physically separated condition but also a condition in which the pressure-contacted condition is released. The driving force of the clutch-outer 4 can be transmitted to the clutch-inner 5 in the pressure-contacted condition, on the contrary the driving force of the clutch-outer 4 cannot be transmitted to the clutch-inner 5 in the separated condition.

The clutch piston 8 can comprise an annular member arranged so that one surface 8a faces toward an oil pressure chamber S1 (FIG. 2) and the other (opposite) surface 8b faces toward the driving clutch plates 6 or driven clutch plates 7. The clutch piston 8 can be displaced toward a clutch-on side (left-side in FIG. 1) against an urging force of the return spring 10 by supplying oil to the oil pressure chamber S1 via the oil passages Y, Y1 to pressure-contact the driving clutch plates 6 and driven clutch plates 7 each other so as to transmit a driving force of the clutch-outer 4 to the clutch-inner 5. On the other hand, the clutch piston 8 can be returned toward a clutch-off side (right-side in FIG. 1) by the urging force of the return spring 10 by discharging the oil in the oil pressure chamber S1 via the oil passages Y1, Y to separate the driving and driven clutch plates 6, 7 from each other so as to cut off the transmission of driving force from the clutch-outer 4 to the clutch inner 5.

The reversing clutch 3 can comprise the clutch-outer (input member) 12 driven by the driving force of an engine via the input shaft 1, the clutch-inner (output member) 13 connected to driving wheels (not shown) of a vehicle, a plurality of driving clutch plates 14, a plurality of driven clutch plates 15, and the clutch piston 16. In drawings a reference numeral 17 denotes a Belleville spring and a reference numeral 18 denotes a return spring arranged between a spring seat 19 and the clutch piston 16.

The driving clutch plates 14 can comprise a plurality of annular plate members spline-fitted on the clutch-outer 12 slidably in an axial direction (right and left directions in FIG. 1) therealong. The driven clutch plates 15 can comprise a plurality of annular plate members arranged alternately with the driving clutch plates 14 and spline-fitted on the clutch-inner 13 slidably in an axial direction (right and left directions in FIG. 1) therealong. Since the driving clutch plates 14 and the driven clutch plates 15 are arranged alternately each other in a layered structure, it is possible to shift them to a pressure-contacted condition (shown in FIG. 2) and to a separated condition (shown in FIG. 1). As previously described, the term "separated condition" means not only a physically separated condition but also a condition in which the pressure-contacted condition is released. The driving force of the clutch-outer 12 can be transmitted to the clutch-inner 13 in the pressure-contacted condition, on the contrary the driving force of the clutch-outer 12 cannot be transmitted to the clutch-inner 13 in the separated condition.

The clutch piston 16 can comprise an annular member and arranged so that one surface 16a faces toward an oil pressure chamber S2 (FIG. 2) and the other (opposite) surface 16b faces toward the driving clutch plates 14 or driven clutch plates 15. The clutch piston 16 can be displaced toward a clutch-on side (right-side in FIG. 1) against an urging force of the return spring 18 by supplying oil to the oil pressure chamber S2 via the oil passages Y, Y2 to pressure-contact the driving clutch plates 14 and driven clutch plates 15 each other so as to transmit a driving force of the clutch-outer 12 to the clutch-inner 13. On the other hand, the clutch piston 16 can be returned toward a clutch-off side (left-side in FIG. 1) by the urging force of the return spring 18 by discharging the oil in the oil pressure chamber S2 via the oil passages Y2, Y to separate the driving and driven clutch plates 14, 15 from each other so as to cut off the transmission of driving force from the clutch-outer 12 to the clutch inner 13.

Figure 1:
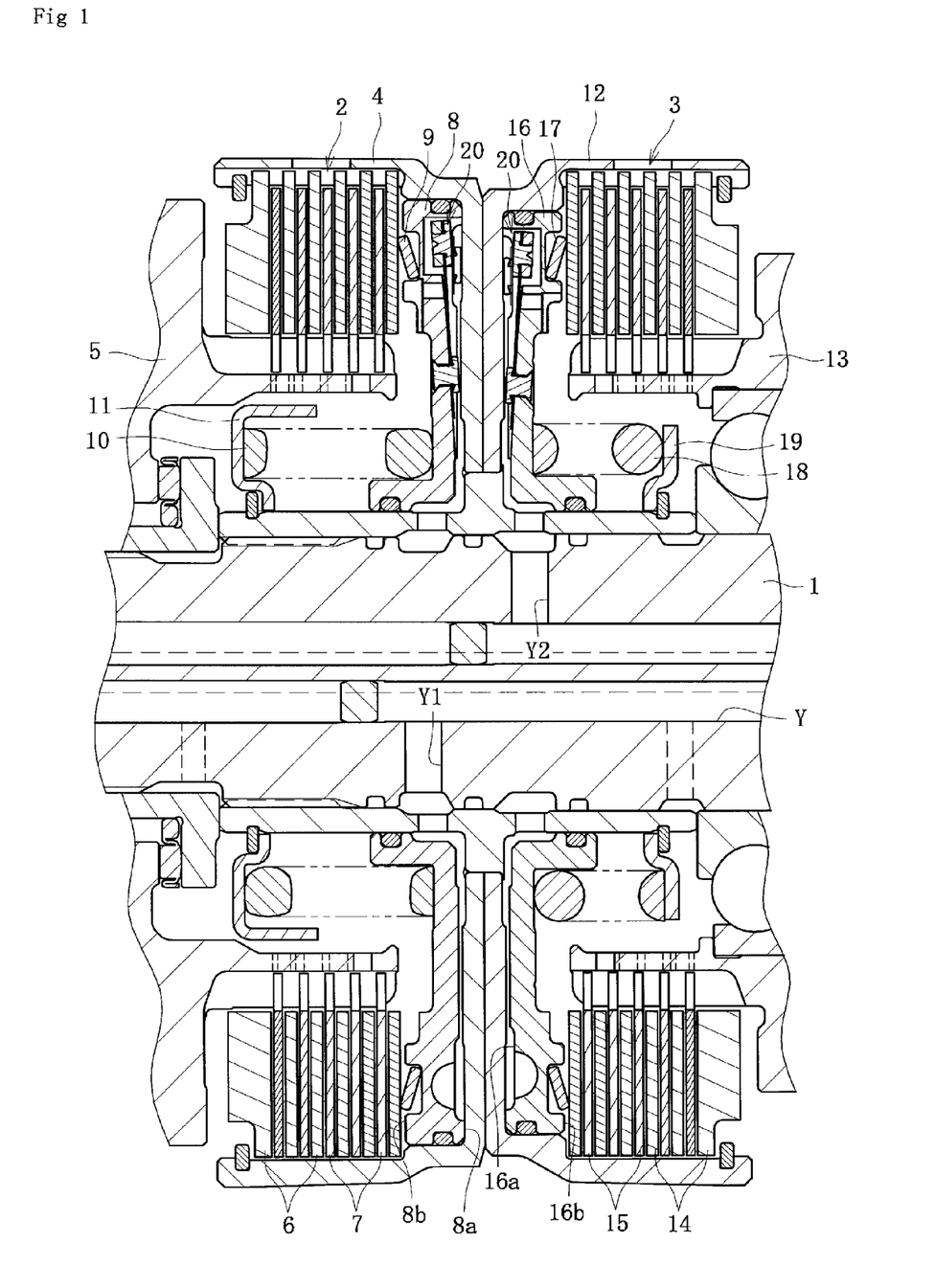
FIG. 1 A longitudinal-section view of a multiple disc clutch apparatus of an embodiment in a "clutch-off" condition.
Figure 2:
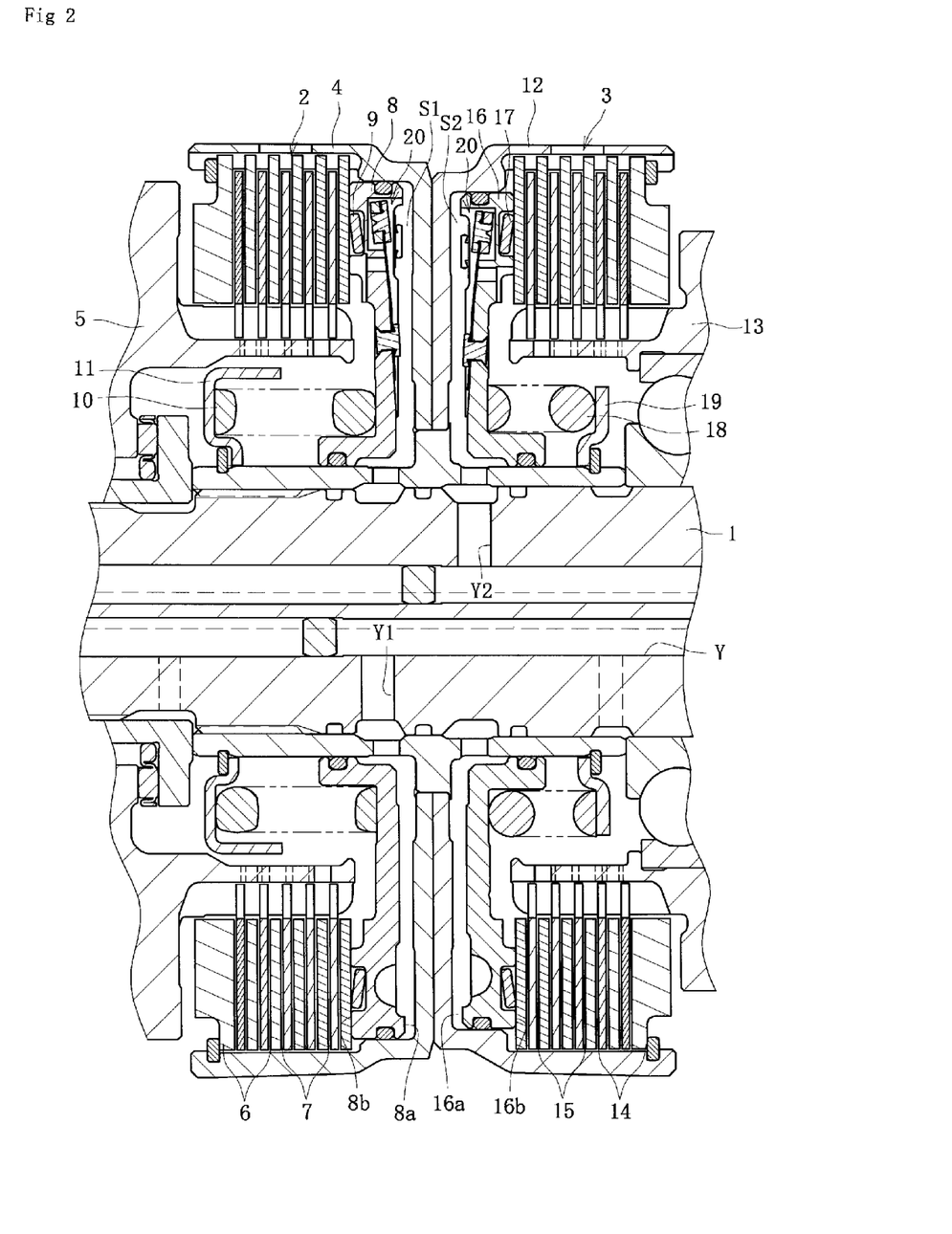
FIG. 2 A longitudinal-section view of the multiple disc clutch apparatus in a "clutch-on" condition.
Figure 3:
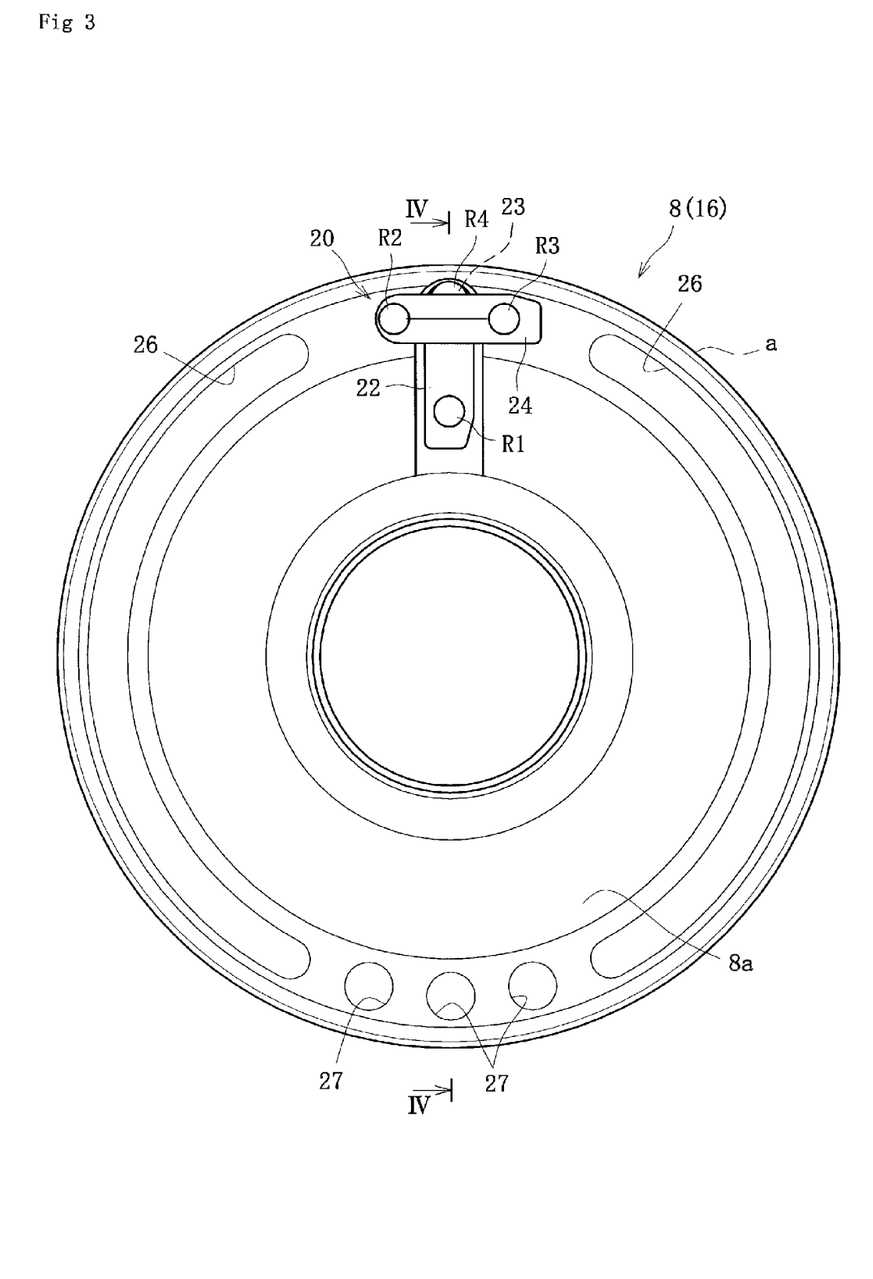
FIG. 3 A front elevation view of a clutch piston used in the multiple disc clutch apparatus of FIG. 1.
Figure 4:
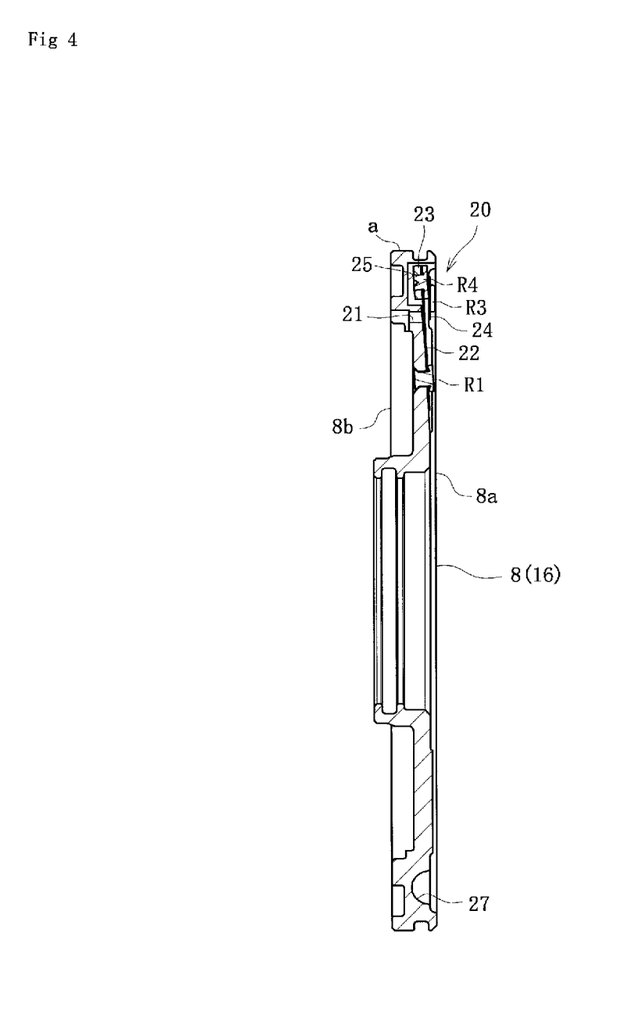
FIG. 4 A cross-sectional side elevation view taken along a line IV-IV of FIG. 3.
Figure 5:
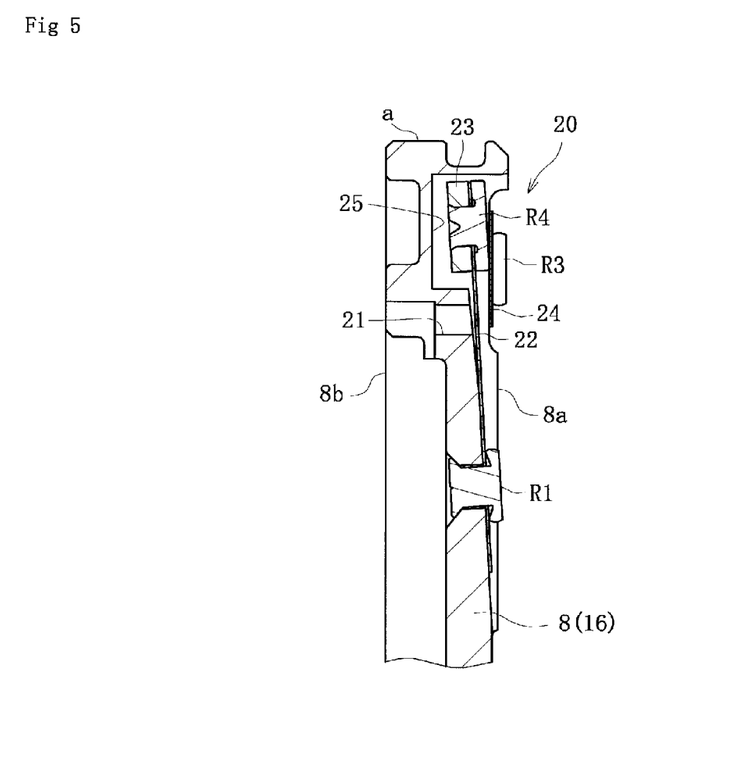
FIG. 5 A partially enlarged view of a valve of the clutch piston.

The clutch pistons 8, 16 are described in more detail below. Since the clutch pistons 8, 16 have same structures and functions, the below description refers only to the clutch piston 8, but it to be understood that the descriptions also apply to clutch piston 16. As shown in FIGS. 3~5, the clutch piston 8 can be provided with a valve 20 (which can serve as a "valve means") formed with being passed through the one surface 8a and the other surface 8b of the clutch piston 8 and adapted to occupy a closed condition for preventing oil from flowing from the oil pressure chamber S1 to the side of other surface 8b of the clutch piston 8 when the clutch apparatus is clutched on and also adapted to occupy an opened condition for allowing flow of air from the side of other surface 8b to the oil pressure chamber S1 when the clutch apparatus is clutched-off The valve 20 can comprise a through aperture 21; a valve body 22 made of flexible plate adapted to deflect and close the through aperture 21 when the clutch apparatus is clutched-on and also adapted to recover its original configuration and open the through aperture 21 when the clutch apparatus is clutched-off; and a weight portion 23 mounted on a tip of the valve body 22.

The base end (bottom end in FIGS. 3~5) of the valve body 22 can be secured on the clutch piston 8 by a rivet R1 and the clutch piston 8 can be formed with containing recess 25 for containing the weight 23 mounted on the tip of the valve body 22 when the valve body 22 is deflected. The valve body 22 can be suppressed by a suppressing plate 24 secured on the clutch piston 8 by rivets R2, R3 to prevent the valve body 22 from being deflected to a side opposite to the through aperture 21. A reference character R4 denotes a rivet for securing the weight 23 on the tip of the valve body 22.

Since the oil pressure chamber S1 is supplied with oil and the pressure within the pressure chamber S1 is increased when the clutch apparatus is actuated to the clutch-on condition, the valve body 22 can be deflected around the rivet R1 toward the through aperture 21 and close it. This further reduces or prevents the oil supplied into the oil pressure chamber S1 from being flowed out through the through aperture 21 and thus to quickly displace the clutch piston 8 toward the driving and driven clutch plates 6, 7 to connect them.

On the other hand, since the oil within the oil pressure chamber S1 is discharged when the clutch apparatus is actuated to the clutch-off condition, the valve body 22 can be recovered to its original configuration to open the through aperture 21. Supply of air via the through aperture 21 in addition to the discharge of oil enables the clutch piston 8 to be quickly returned to its initial position (position opposite to the driving and driven clutch plates 6, 7).

In some embodiments, the clutch piston 8 can be formed with recesses 26 for weight reduction on the one surface 8a of the clutch piston 8 at a position near the outer circumference "a", which can be further radially outward relative to the position of the valve 20. As shown in FIG. 3, each of the recesses 26 can be formed as a circular arc groove along the outer circumference "a" of the clutch piston 8, for example, by removing partial material forming the clutch piston during or after the formation of the clutch piston 8. The weight of the clutch piston 8 can be reduced by the recesses 26.

Figure 6:
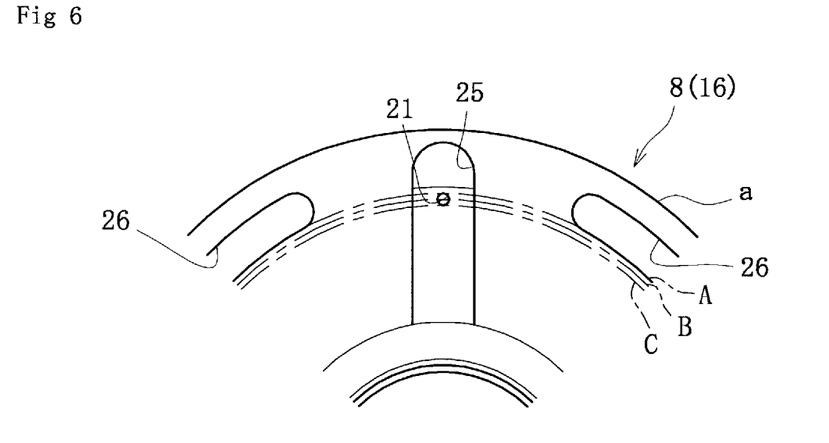
FIG. 6 A schematic view showing a position of recesses formed on the clutch piston.
Figure 7:
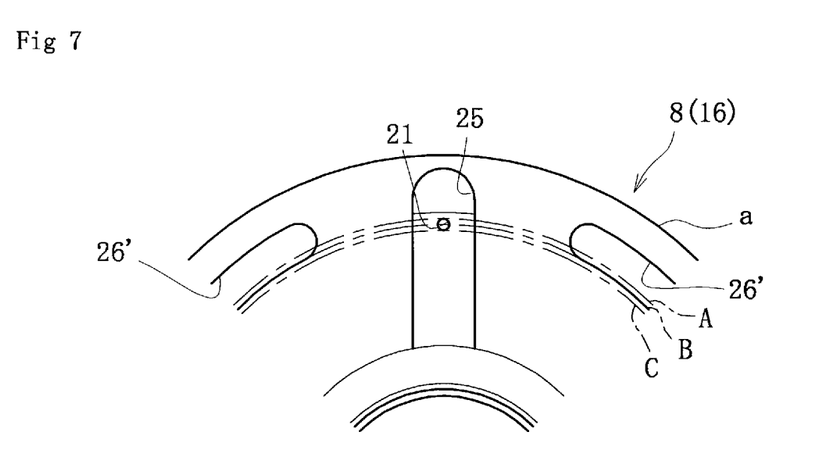
FIG. 7 A schematic view showing another position of recesses formed on the clutch piston.
Figure 8:
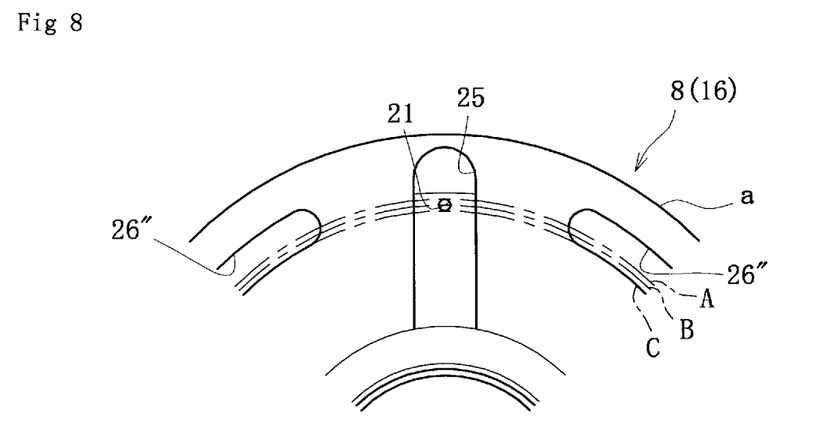
FIG. 8 A schematic view showing a further position of recesses formed on the clutch piston.

Although the recesses 26 can be formed at a position near the outer circumference "a", further radially outward than the through aperture 21, it can also be configured in accordance with the following options: i) recesses 26 formed at a position further radially outward than a coaxial circle A centered on the center of the clutch piston 8 and passing through a radially outermost portion of the through aperture 21 as shown in FIG. 6, ii) recesses 26' formed at a position radially outer than a coaxial circle B centered on the center of the clutch piston 8 and passing through a center of the through aperture 21 as shown in FIG. 7, and iii) recesses 26" formed at a position radially outer than a coaxial circle C centered on the center of the clutch piston 8 and passing through a radially innermost portion of the through aperture 21 as shown in FIG. 8. Other positions can also be used.

In addition, the recesses include recesses 27 arranged at a position diametrically opposite to the valve 20. The recesses 27 can be configured to equalize the weight balance of the clutch piston 8 during its rotation in addition to further reducing the weight of the clutch piston 8. The size, configuration or number of the recesses 27 can be determined to correct and equalize the weight balance of the clutch piston 8 which might be locally imbalanced by the provision of valve means 20. In the illustrated embodiment of FIG. 3, 3 (three) recesses 27 are formed.

In accordance with some embodiments, since recesses 26 (including recesses 26' 26" and so on) for weight reduction are formed on the surface 8a of the clutch piston 8 at a position near the outer circumference "a" further radially outward than the valve 20 (more strictly outer than the through aperture 21), it is possible to reduce the weight of a clutch piston 8 without substantially changing the volume of a oil pressure chamber S1 and improve the response (response performance) of the clutch piston 8 with suppressing shock during speed change of a vehicle.

For example, since the recess 26 can be formed at a substantially radially outermost portion along the outer circumference "a" of the clutch piston 8, the recess 26 can be always filled with oil moved radially outward by the action of centrifugal force when the clutch piston 8 is returned to the clutch-off side by discharging oil from the oil pressure chamber S1. Accordingly it is possible to further reduce the weight of the clutch piston 8 and thus improve the response thereof without substantially varying the volume of the oil pressure chamber S1 even though the recess 26 for weight reduction of the clutch piston 8 are provided.

In addition, since the recess 26 can be formed at a position further radially outward than a position at which the valve 20 is arranged, it is possible to reduce the inertia and thus the response of the clutch piston 8 more effectively than a case in which the recess is formed at a position radially inward of the valve 20.

The recesses can include recesses 27 arranged at a position diametrically opposite to the valve means 20. Since the recesses 27 are intended to equalize the weight balance of the clutch piston 8 during its rotation in addition to reduce the weight thereof, it is possible to simultaneously achieve the weight reduction and equalization of the weight balance of the clutch apparatus. Although 3 (three) recesses 27 each having circular configuration are illustrated in FIG. 3, other forms of the recesses 27 may be used such as those of two or more than three circular configuration, of rectangular or elongated configuration.

In addition, since the valve 20 can comprise a through aperture 21, a valve body 22 made of flexible plate adapted to deflect and close the through aperture 21 when the clutch apparatus is clutched-on and also adapted to recover its original configuration and open the through aperture 21 when the clutch apparatus is clutched-off, and a weight portion 23 mounted on the valve body 22, it is possible to accurately perform the opening and closing operation of the valve 20 and thus smooth operation of the clutch piston 8 irrespective of the speed of a vehicle.

Figure 9:
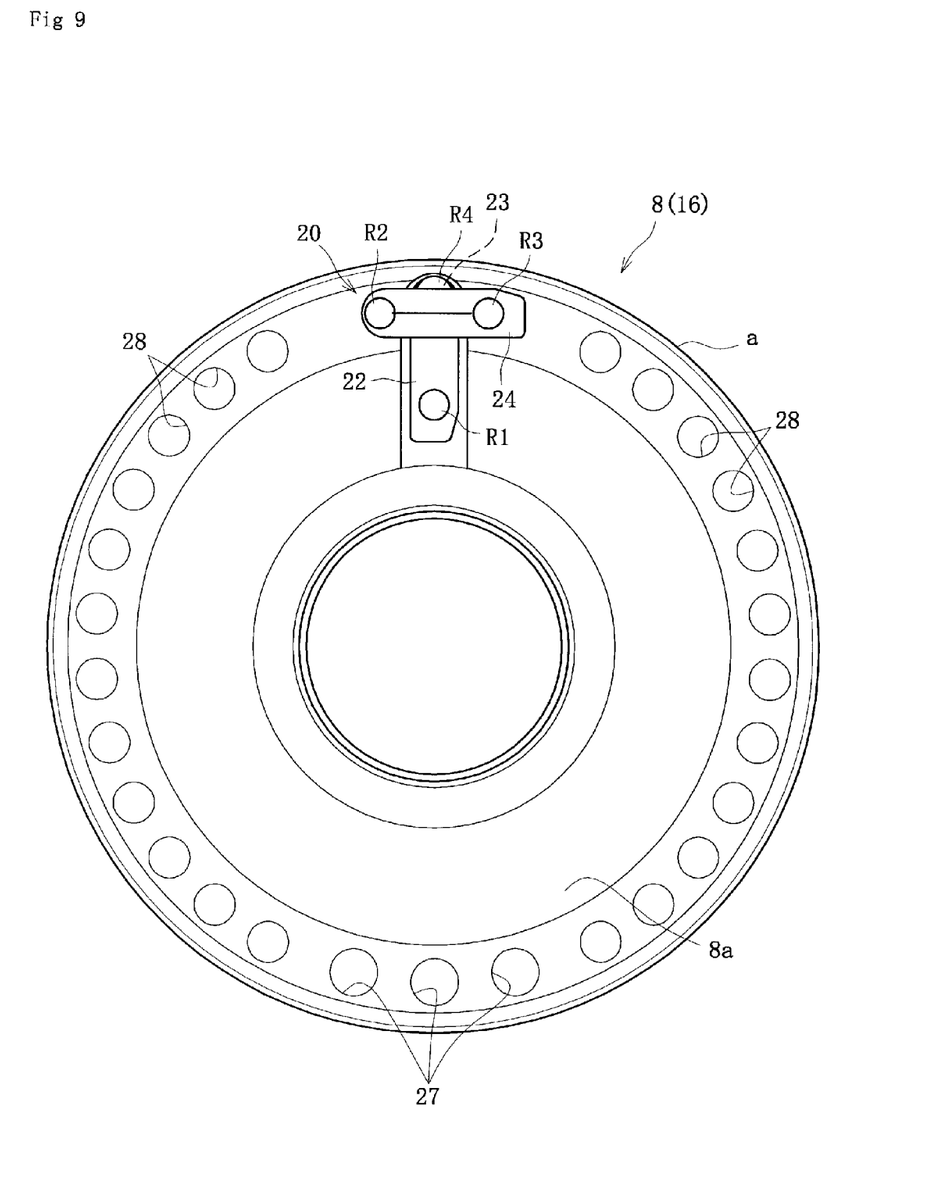
FIG. 9 A front elevation view showing a clutch piston of one of other embodiments.
Figure 10:
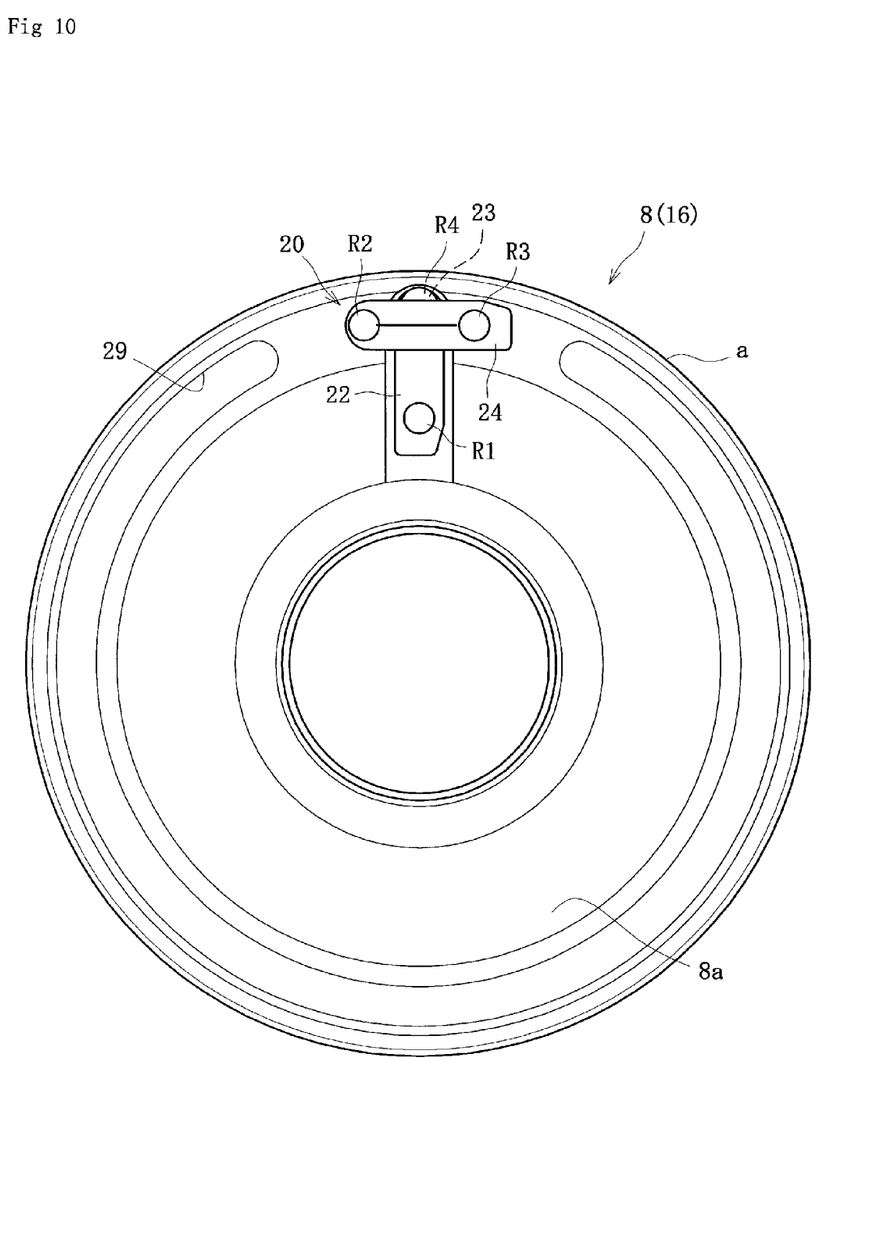
FIG. 10 A front elevation view showing a clutch piston of one of other embodiments.
Figure 11:
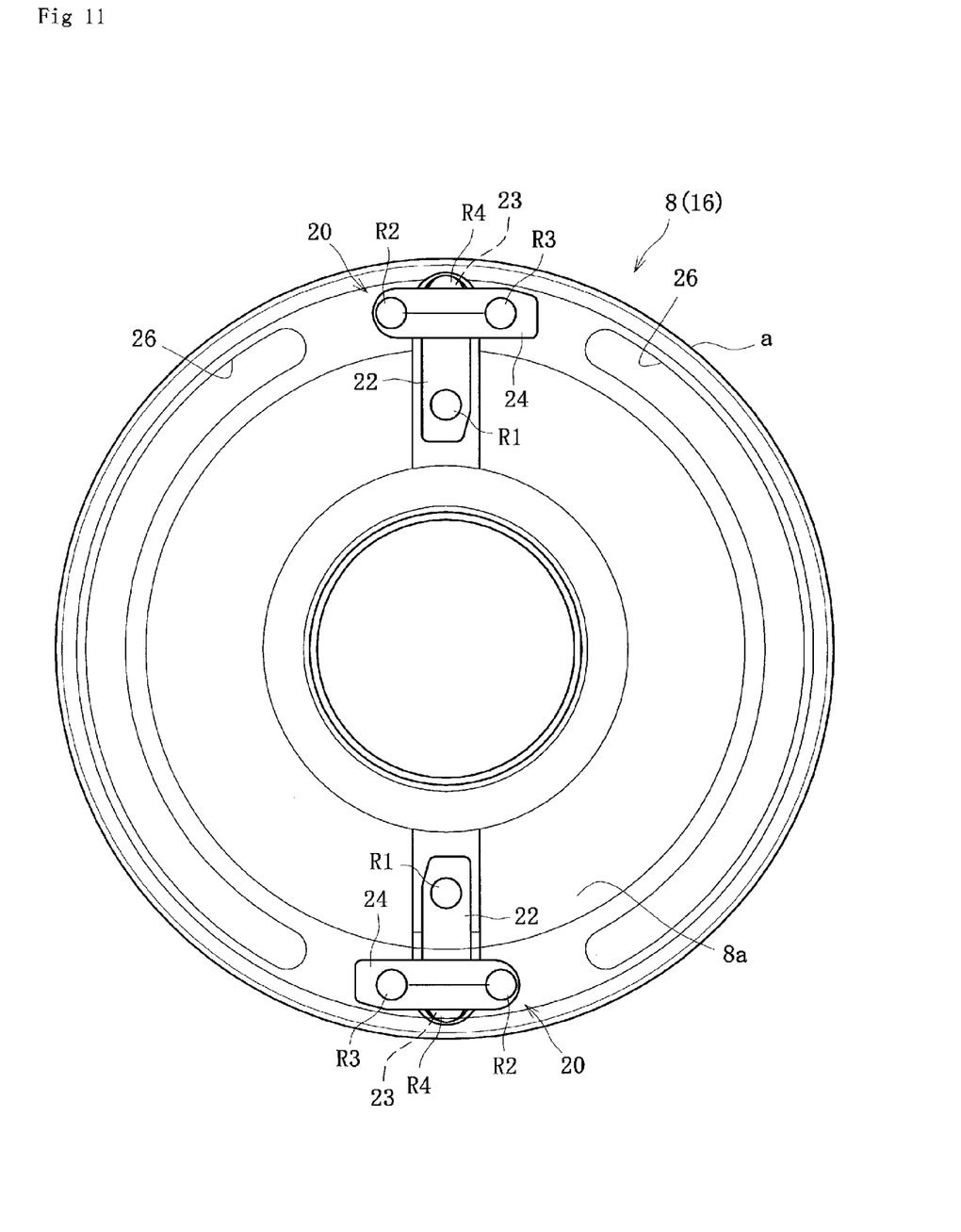
FIG. 11 A front elevation view showing a clutch piston of one of other embodiments.

In some embodiments, other recesses for weight reduction, which are different from illustrated elongated grooves, can also be used. For example as shown in FIG. 9, recesses comprising a plurality of circular recesses 28 can be used. In such embodiments, the recesses 28 can be disposed at a position further radially outward than the valve 20 and near the outer circumference "a" of the clutch piston 8. In addition as shown in FIG. 10, the recess can be formed as a single elongated groove 29 formed substantially round along the outer circumference "a" of the clutch piston 8 without a portion in which the valve 20 is arranged without any additional recess such as recesses 27 at a position diametrically opposite to the valve 20. Furthermore, it is also possible as shown in FIG. 11 to provide another valve 20 at a position diametrically opposite to the initially arranged valve 20 of the clutch piston 8 in place of provision of any recesses for achieving the weight balance of the clutch piston 8.

Figure 12:
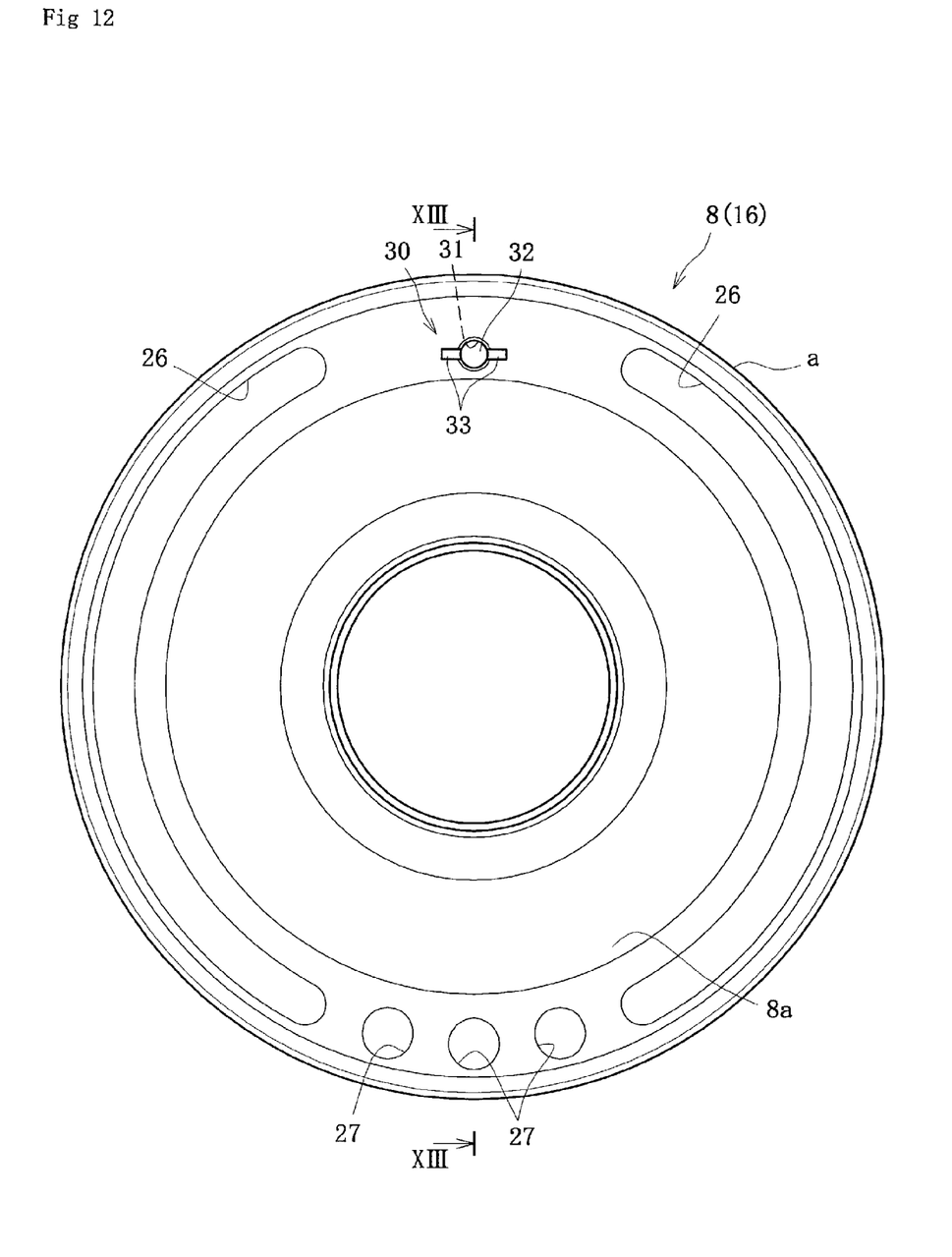
FIG. 12 A front elevation view showing a clutch piston of one of other embodiments.
Figure 13:
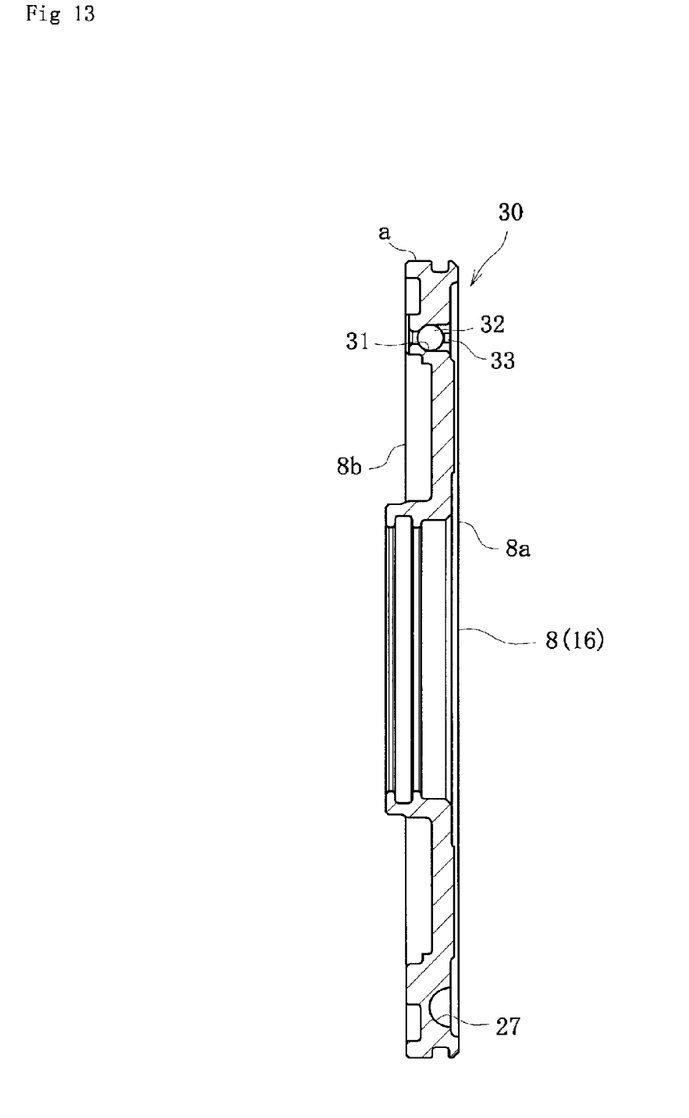
FIG. 13 A cross-sectional side elevation view taken along a line XIII-XIII of FIG. 12.

The above embodiments have been described with reference to certain embodiments, which can be modified within the scope of the inventions disclosed herein. For example, the valve 20 can be in the form of a different valve 30 shown in FIGS. 12 and 13 having a structure comprising a through aperture 31 extending between one surface 8a and the other surface 8b of the clutch piston 8 and a metallic ball 32 closable the through aperture 31, and adapted to close the through aperture 31 by the ball 32 when the clutch apparatus is clutched-on and to open the through aperture 31 by moving the ball 32 away from the through aperture 31 when the clutch apparatus is clutched-off. The ball 32 can be held in place e.g. by a caulked portion 33. In addition, the recesses 26 (similarly to the recesses 26', 26" and 27) can be formed by forging or cutting a surface of the clutch piston 8 simultaneously with the formation of the clutch piston 8.

Figure 14:
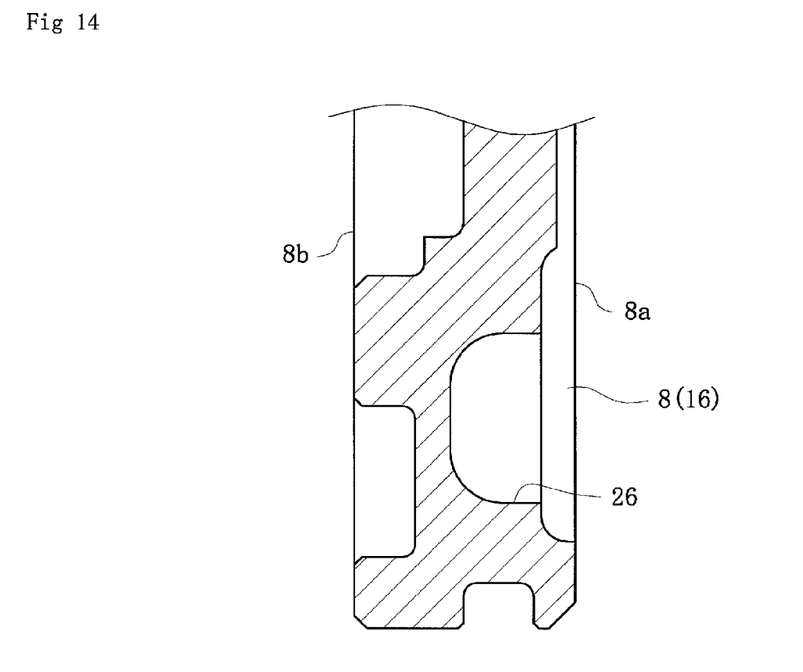
FIG. 14 A schematic view showing a cross-sectional configuration (rounded-corner rectangular configuration) of a recess in another embodiment of the present invention.
Figure 15:
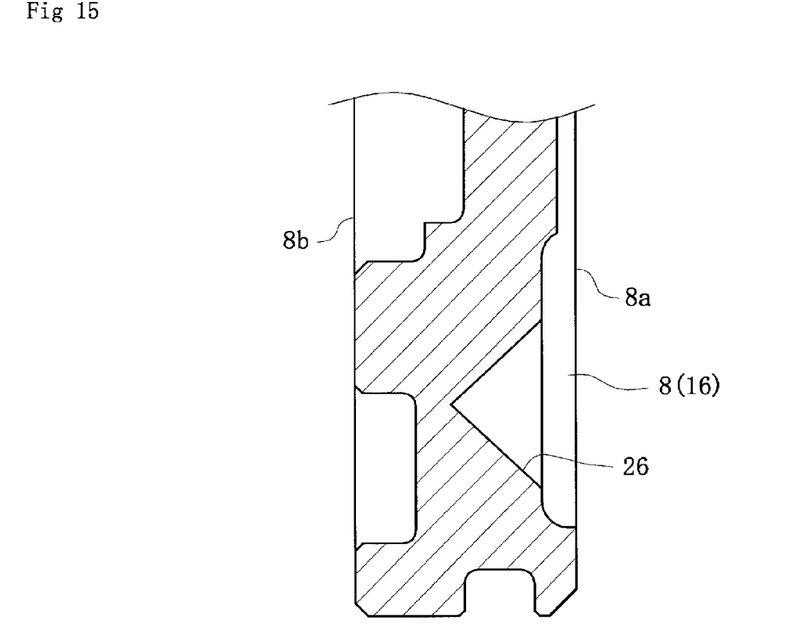
FIG. 15 A schematic view showing a cross-sectional configuration (tri-angular configuration) of a recess in a further embodiment of the present invention.
Figure 16:
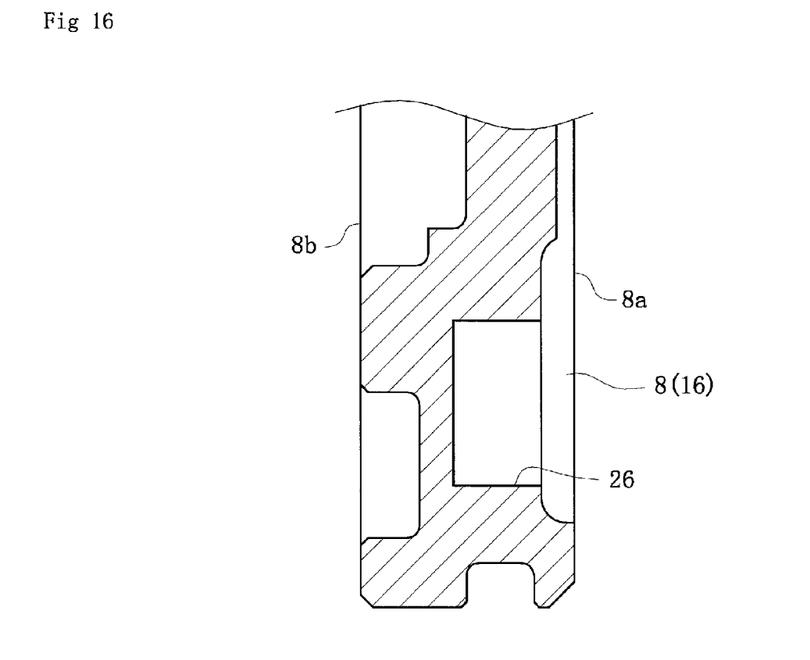
FIG. 16 A schematic view showing a cross-sectional configuration (rectangular configuration) of a recess in a further embodiment of the present invention.
Figure 17:
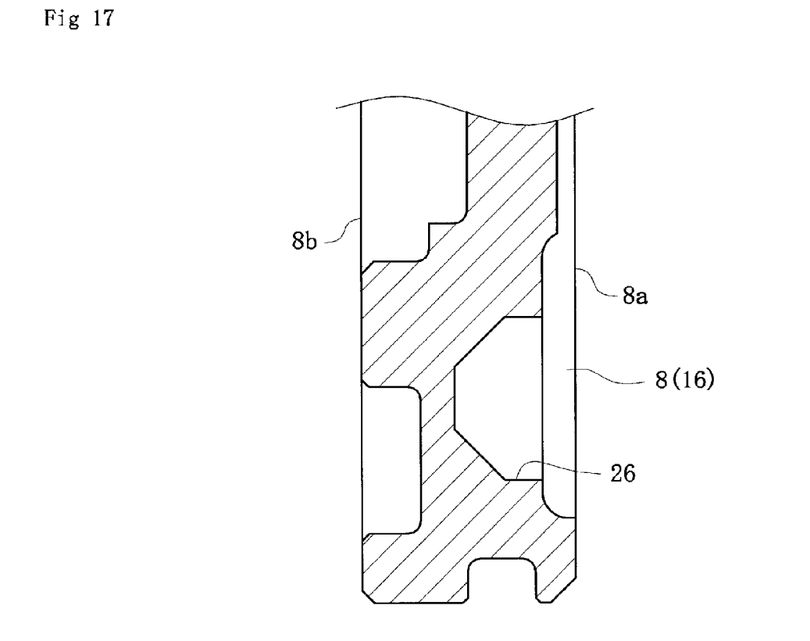
FIG. 17 A schematic view showing a cross-sectional configuration (trapezoidal configuration) of a recess in a further embodiment of the present invention.
Figure 18:
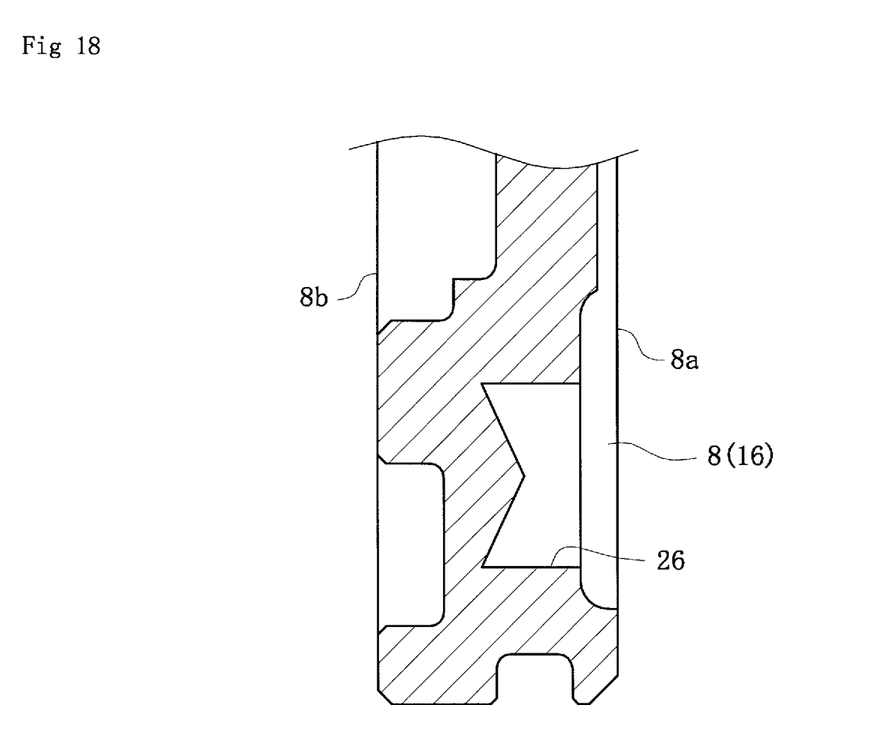
FIG. 18 A schematic view showing a cross-sectional configuration ("M" shaped configuration) of a recess in a further embodiment of the present invention.

Although it is shown in FIG. 4 that the recesses 26 (similarly to the recesses 26', 26" and 27) have a circular arc cross-section, recesses with other cross-sectional configurations can also be used, for example but without limitation, a rounded-corner rectangular (FIG. 14), a tri-angular (FIG. 15), a rectangular (FIG. 16), a trapezoidal (FIG. 17) etc. In addition, a recesses 26 having a "M" shaped cross-section (having a center projected toward outside) (FIG. 18) may be also used. This enables easy formation of the recess 26 especially in forging.

Some embodiments of the multiple disc clutch apparatus described above can be applied to those having structural components of different configurations and additional functions, if they are provided with recesses for weight reduction at a position further radially outward than a valve arranged on one surface of a clutch piston.

What is claimed is:

1. A multiple disc clutch apparatus comprising:
   a plurality of driving clutch plates spline-fitted and axially slidable on an input member rotated by a driving source;
   a plurality of driven clutch plates arranged alternately with the driving clutch plates and spline-fitted and axially slidable on an output member;
   a clutch piston having a first surface facing axially toward an oil pressure chamber and a second surface facing toward the driving clutch plates or driven clutch plates, the clutch piston being configured to be displaced toward a clutch-on side when oil is supplied to the oil pressure chamber and thereby pressure-contact the driving clutch plates and driven clutch plates to each other so as to transmit a driving force of the input member to the output member, the clutch piston also being configured to be returned toward a clutch-off side when oil is discharged from the oil pressure chamber and thereby allowing the driving and driven clutch plates to separate from each other so as to cut off the transmission of driving force from the input member to the output member;
   a valve disposed at least partially in a valve recess in the first surface of the clutch piston and formed so as to pass through the first surface and the second surface of the clutch piston and configured to occupy a closed condition preventing the oil from flowing from the oil pressure chamber to the side of second surface of the clutch piston when the clutch apparatus is clutched-on, the valve also being configured to occupy an opened condition allowing flow of air from the side of second surface to the oil pressure chamber when the clutch apparatus is clutched-off; and
   a suppressing plate configured to limit movement of one or more portions of the valve in at least one direction;
   wherein at least one weight reducing recess providing weight reduction is formed on the first surface of the clutch piston at a position near the outer circumference of the clutch piston and circumferentially spaced from the valve recess.

2. A multiple disc clutch apparatus of claim 1 wherein the at least one weight reducing recess is formed as a long groove.

3. A multiple disc clutch apparatus of claim 1, wherein the clutch piston includes at least one additional recess arranged at a position diametrically opposite to the valve, the at least one additional recess being configured to equalize the weight balance of the clutch piston during rotation of the clutch piston and in addition to reduce the weight of the clutch piston.

4. A multiple disc clutch apparatus of claim 2, wherein the clutch piston includes at least one additional recess arranged at a position diametrically opposite to the valve, the at least one additional recess being configured to equalize the weight balance of the clutch piston during rotation of the clutch piston and in addition to reduce the weight of the clutch piston.

5. A multiple disc clutch apparatus of claim 1 wherein the valve comprises:
   a through aperture;
   a valve body made of flexible plate adapted to deflect and close the through aperture when the clutch apparatus is clutched-on and also adapted to recover the original configuration of the flexible plate and open the through aperture when the clutch apparatus is clutched-off; and
   a weight portion mounted on the valve body.

6. A multiple disc clutch apparatus of claim 2 wherein the valve comprises:
   a through aperture;
   a valve body made of flexible plate adapted to deflect and close the through aperture when the clutch apparatus is clutched-on and also adapted to recover the original configuration of the flexible plate and open the through aperture when the clutch apparatus is clutched-off; and a weight portion mounted on the valve body.

7. A multiple disc clutch apparatus of claim 3 wherein the valve comprises:

a through aperture;

a valve body made of flexible plate adapted to deflect and close the through aperture when the clutch apparatus is clutched-on and also adapted to recover the original configuration of the flexible plate and open the through aperture when the clutch apparatus is clutched-off; and a weight portion mounted on the valve body.

8. A multiple disc clutch apparatus of claim 4 wherein the valve comprises:

a through aperture;

a valve body made of flexible plate adapted to deflect and close the through aperture when the clutch apparatus is clutched-on and also adapted to recover the original configuration of the flexible plate and open the through aperture when the clutch apparatus is clutched-off; and a weight portion mounted on the valve body.

\* \* \* \* \*